US006076418A

United States Patent [19]
Vandeventer

[11] Patent Number: 6,076,418
[45] Date of Patent: Jun. 20, 2000

[54] LASH ADJUSTMENT MECHANISM

[75] Inventor: Eric Vandeventer, Lafayette, Ind.

[73] Assignee: TRW Inc., Lyndhurst, Ohio

[21] Appl. No.: 09/176,184

[22] Filed: Oct. 21, 1998

[51] Int. Cl.[7] .............................. B62D 3/12; F16H 55/28; F16H 35/08

[52] U.S. Cl. ............................. 74/409; 74/400; 74/89.17; 74/498

[58] Field of Search .............................. 74/400, 409, 498, 74/499, 89.17, 422

[56] References Cited

U.S. PATENT DOCUMENTS

| | | | |
|---|---|---|---|
| 2,936,643 | 5/1960 | Smith et al. . | |
| 2,984,121 | 5/1961 | Folkerts . | |
| 3,060,762 | 10/1962 | Lutz . | |
| 3,252,348 | 5/1966 | Folkerts . | |
| 3,600,965 | 8/1971 | Folkerts . | |
| 5,211,069 | 5/1993 | Wada et al. ............................... | 74/400 |

*Primary Examiner*—David A. Bucci
*Assistant Examiner*—William C Joyce
*Attorney, Agent, or Firm*—Tarolli, Sundheim, Covell, Tummino & Szabo L.L.P.

[57] ABSTRACT

An apparatus (10) for use in turning steerable vehicle wheels includes a rack gear (14) and a sector gear (16) which are disposed in meshing engagement. A housing (30) encloses the rack and sector gears (14 and 16). A sector shaft (22) has an inner end portion (34) connected with the sector gear (16) and an outer end portion (36) disposed outside of the housing (30). A lash adjustment assembly (56) is operable to move the sector gear (16) and shaft (22) relative to the housing (30) to reduce clearance between teeth (18 and 20) on the rack and sector gears. The lash adjustment assembly (56) is manually actuatable at the outer end of the sector shaft (22). The lash adjustment assembly (56) includes an elongated member (60) which extends through the sector shaft (22) and the sector gear (16) into engagement with the housing (30).

2 Claims, 2 Drawing Sheets

30
10
14
18
12
42
36
44
40
72
20
46
64
76
24
56
62
68
22
50
60
34
16
48

10
30
14
18
42
46
76
62
40
48
20
16
12
44
34
60
72
36
50
22
64
56
68
24

10a
30a
42
46a
100
62a
92
96
94
60a
98
44a
72a
36a
90
24a
56a
68a
22a
102
50a

LASH ADJUSTMENT MECHANISM

BACKGROUND OF THE INVENTION

The present invention relates to a lash adjustment assembly which is effective to reduce clearance between teeth on gears in a vehicle steering apparatus.

A known steering apparatus includes a housing which encloses rack and sector gears. A pitman or sector shaft is connected with the sector gear and extends out of the housing. The end portion of the sector shaft which is disposed outside the housing is connected with a vehicle steering linkage.

This known steering apparatus includes a lash adjustment assembly to compensate for gear tooth wear. The lash adjustment assembly includes an adjusting screw which is connected with the housing and the sector gear. The lash adjustment screw is disposed opposite from the end of the sector shaft which extends out of the housing. This may result in the lash adjustment screw being located next to a frame rail on a vehicle. The frame rail blocks access to the lash adjustment screw after the steering apparatus has been installed in the vehicle. This known steering apparatus is disclosed in U.S. Pat. No. 3,060,762. Other known steering apparatus having lash adjustment assemblies are disclosed in U.S. Pat. Nos. 2,936,643; 3,252,348; and 3,600,965.

SUMMARY OF THE INVENTION

The present invention provides a new and improved apparatus for use in turning steerable vehicle wheels. The apparatus includes a housing which encloses sector and rack gears having teeth which are disposed in meshing engagement. A sector shaft has a first end portion which is disposed in the housing and is connected with the sector gear and a second end portion which extends out of the housing and is connected with the vehicle steering linkage.

A lash adjustment assembly is provided to reduce clearance between teeth of the rack and sector gears. The lash adjustment assembly may extend through both the sector shaft and the sector gear. This results in the lash adjustment assembly being accessible at the second end portion of the sector shaft which is disposed outside the housing.

The lash adjustment assembly may include an elongated member which extends through the sector shaft and the sector gear into engagement with the housing. The elongated member is effective to transmit force between the sector shaft and the housing to move the sector gear relative to the rack gear to reduce clearance between teeth on the sector and rack gears.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein.

DESCRIPTION OF SPECIFIC PREFERRED EMBODIMENTS OF THE INVENTION

General Description

Figure 1:
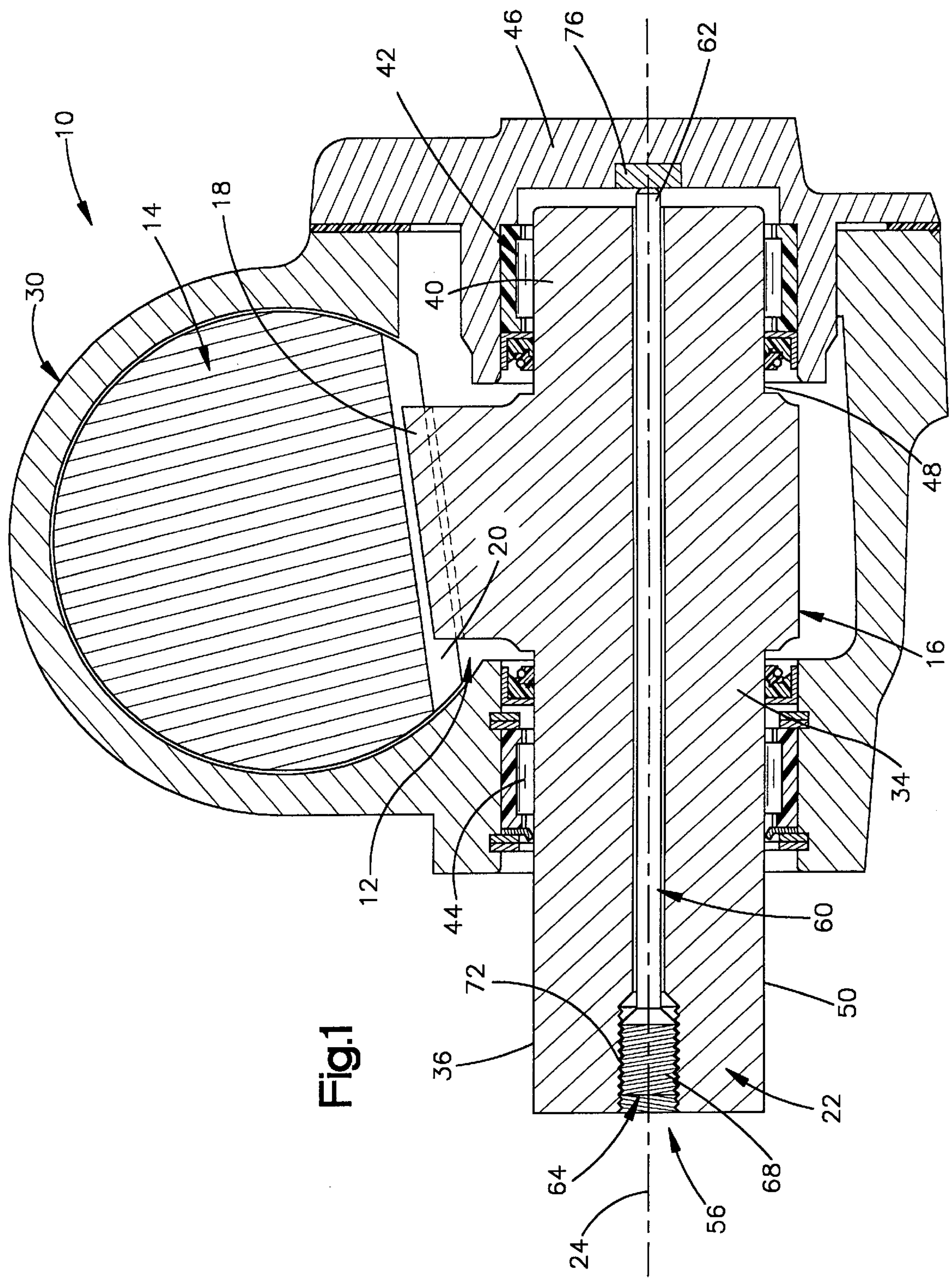
FIG. 1 is a fragmentary sectional view of an apparatus constructed in accordance with the present invention for use in turning steerable vehicle wheels.

An apparatus 10 (FIG. 1) for use in turning steerable vehicle wheels includes a gear set 12 which is actuatable by a power steering motor (not shown). The gear set 12 includes a rack gear 14 connected with a piston of the power steering motor. The gear set 12 also includes a sector gear 16 which has teeth 18 disposed in engagement with teeth 20 on the rack gear 14. A cylindrical sector or output shaft 22 is connected with a pitman arm (not shown) of a vehicle steering linkage in a well-known manner. The sector gear 16 is rotatable about a central axis 24 of the sector shaft 22.

The rack and sector gears 14 and 16 are enclosed by a housing 30. The sector shaft 22 has an inner end portion 34 which is disposed in the housing 30 and which is connected with the sector gear 16. The sector shaft 22 has an outer end portion 36 which is disposed outside of the housing 30 and is connected with a vehicle steering linkage, specifically, with a pitman arm. A cylindrical mounting shaft 40 extends from the sector gear 16 in a direction opposite to the direction in which the sector shaft 22 extends from the sector gear. In the illustrated embodiment of the invention, the sector shaft 36 and mounting shaft 40 are coaxial and are integrally formed as one piece with the sector gear 16.

The sector gear 16 is supported for rotation relative to the housing 30 about the axis 24 by an inner bearing assembly 42 and an outer bearing assembly 44. The inner bearing assembly 42 is mounted on an end wall 46 of the housing 30. The inner bearing assembly 42 engages a cylindrical outer side surface 48 on the mounting shaft 40. The outer bearing assembly 44 engages a cylindrical outer side surface 50 on the sector shaft 22.

The general construction of the rack gear 14 and sector gear 16 and the manner in which they cooperate with a power steering motor is the same as is disclosed in U.S. Pat. Nos. 3,741,074 and 4,164,892. However, the rack and sector gears 14 and 16 could have a different construction and could be associated with a different type of power steering motor if desired.

A lash adjustment assembly 56 is provided to compensate for gear tooth wear. The lash adjustment assembly 56 is operable to move the sector gear 16 and sector shaft 22 relative to the housing 30 and rack gear 14. Relative movement between the sector gear teeth 18 and rack gear teeth 20 reduces clearance between the teeth on the gears and thereby compensates for gear tooth wear.

In accordance with a feature of the present invention, the lash adjustment assembly 56 is accessible at the outer end portion 36 of the sector shaft 22. This enables the lash adjustment assembly 56 to be manually actuated even though access to the end wall 46 of the housing 30 is blocked by a frame member or other component of a vehicle. The outer end portion 36 of the sector shaft 22 is, in most vehicles, accessible so that it can be connected with the steering linkage. This enables the lash adjustment assembly 56 to be easily actuated.

The lash adjustment assembly 56 is operable to transmit force axially through the sector shaft 22 and sector gear 16 to the end wall 46 of the housing 30. The lash adjustment assembly 56 includes an elongated cylindrical member or shaft 60. The shaft 60 is disposed in a cylindrical passage 61 which extends through the sector shaft 22, sector gear 16 and mounting shaft 40. The shaft 60 has an inner end portion 62 which engages the end wall 46 of the housing 30. The shaft 60 has a central axis which is coincident with the axis 24 about which the sector gear 16 rotates and the central axis of the passage 61.

The shaft 60 has an outer end portion 64 which is connected with the outer end portion 36 of the sector shaft 22. An external thread convolution 68 is formed on the outer end portion 64 of the shaft 60. The external thread convolution 68 engages an internal thread convolution 72 formed in the passage 61 at the outer end portion 36 of the sector shaft 22. The external and internal thread convolutions 68 and 72 cooperate to move the shaft 60 along the axis 24 upon rotation of the shaft 60 relative to the sector shaft 22.

A socket (not shown) is provided in the outer end portion 64 of the shaft 60 to be engaged by a suitable tool. The tool applies force to the shaft 60 to rotate the shaft about the central axis 24 of the sector shaft 22.

Upon rotation of the outer end portion 64 of the shaft 60 in the lash adjustment assembly 56 relative to the sector shaft 22, cooperation between the external thread convolution 68 on the shaft 60 and the internal thread convolution 72 on the sector shaft 22 presses the inner end portion 62 of the shaft 60 against the end wall 46 of the housing 30. This force urges the sector gear 16 and sector shaft 22 toward the left (as viewed in FIG. 1). The resulting leftward movement of the sector gear 16 relative to the rack gear 14 reduces the clearance between the sector gear teeth 18 and rack gear teeth 20.

It is preferred to provide the end wall 46 of the housing 30 with a cylindrical plug member 76. The plug member 76 is formed of a relatively hard metal which can resist wear. The plug member 76 is coaxial with the shaft 60. The end portion 62 of the shaft 60 is disposed in engagement with and is rotatable relative to the plug member 76. Of course, the plug member 76 could be omitted if desired.

Lash Adjustment Assembly—Second Embodiment

Figure 2:
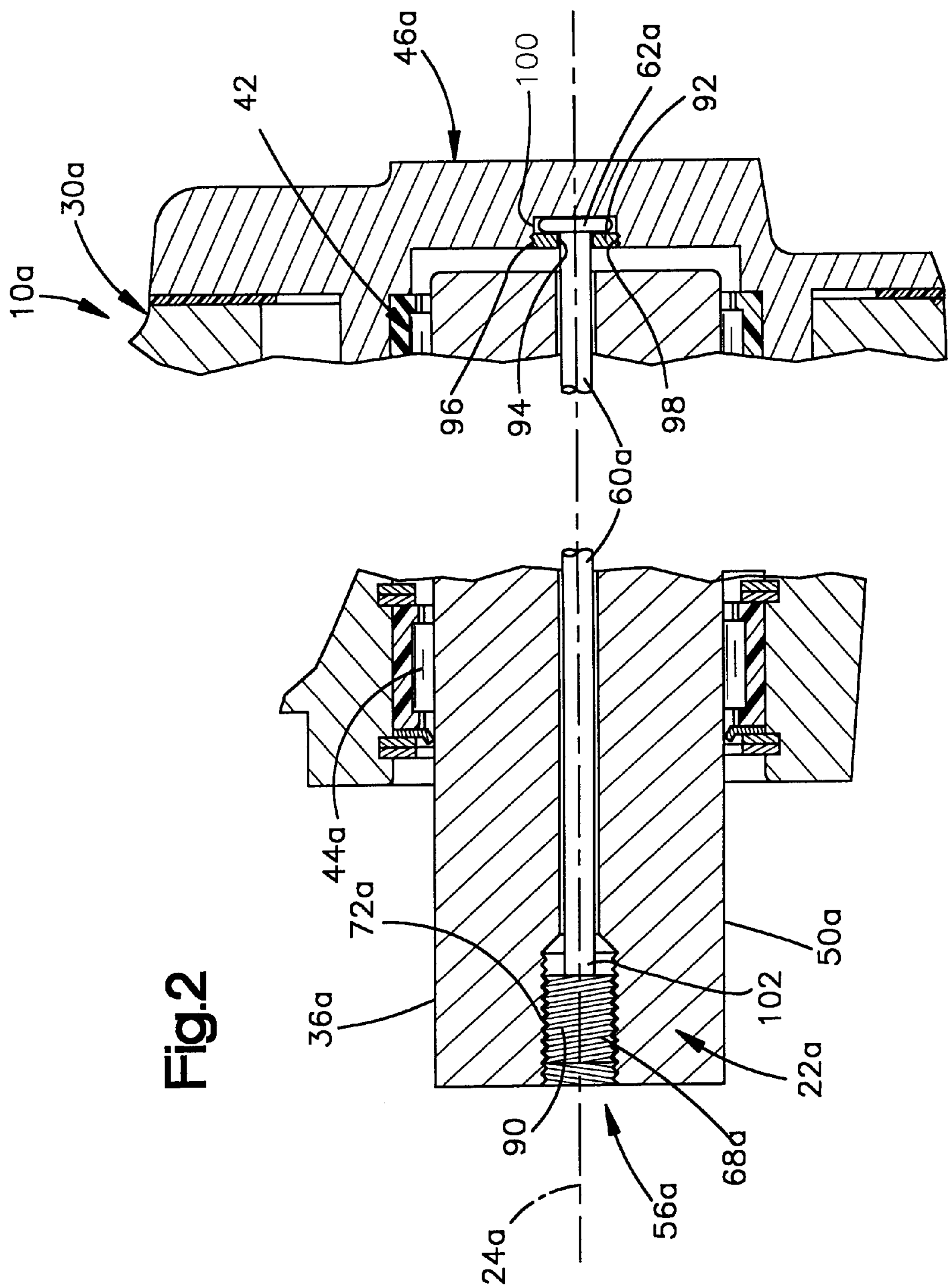
FIG. 2 is a fragmentary sectional view of a second embodiment of the apparatus.

In the embodiment of the invention illustrated in FIG. 2, the lash adjustment assembly 56 includes a one-piece shaft 60 which transmits force between the outer end portion 36 of the sector shaft 22 and the end wall 46 of the housing 30. In the embodiment of the invention illustrated in FIG. 2, the lash adjustment assembly includes a two-piece arrangement for transmitting force between the outer end portion of the sector shaft and the housing. Since the embodiment of the invention illustrated in FIG. 2 is generally similar to the embodiment of the invention illustrated in FIG. 1, similar numerals will be utilized to designate similar components, the suffix letter "a" being associated with the numerals of FIG. 2 to avoid confusion.

An apparatus 10*a* (FIG. 2) includes a gear set (not shown) corresponding to the gear set 12 of FIG. 1. The gear set is actuatable by a power steering motor. The gear set includes a rack gear (not shown) corresponding to the rack gear 14 of FIG. 1. The rack gear is connected with a piston of a power steering motor.

The gear set also includes a sector gear (not shown) corresponding to the sector gear 16 of FIG. 1. The sector gear has gear teeth disposed in engagement with gear teeth on the rack gear. A sector or output shaft 22*a* has an outer end portion connected with a steering linkage, specifically, with a pitman arm.

The sector gear and sector shaft 22*a* are supported for rotation about an axis 24*a* by an inner bearing assembly 42*a* and an outer bearing assembly 44*a*. The inner and outer bearing assemblies 42*a* and 44*a* are mounted in a housing 30*a* having an end wall 42*a*. The housing 30*a* encloses the rack and sector gears.

In accordance with a feature of this embodiment of the invention, a lash adjustment assembly 56*a* includes a cylindrical plug member 90 (FIG. 2). The plug member 90 has an external thread convolution 68*a* which engages an internal thread convolution 72*a* formed on the outer end portion 36*a* of the sector shaft 22*a*. a shaft 60*a* extends between the plug member 90 and the end wall 46*a* of the housing 30*a*.

The shaft 60*a* has an enlarged circular inner end portion 62*a* which applies force against the end wall 46*a* of the housing 30*a*. By having the end portion 62*a* of the shaft 60*a* enlarged, force is applied over a relatively large area on the end wall 46*a* of the housing 30*a*. Therefore, the plug 76 of FIG. 1 can be omitted.

An annular retaining plug member 92 has a central opening 94 through which the shaft 60*a* extends. The retaining plug member 92 has an external thread convolution 96 which engages an internal thread convolution 98 formed in the end wall 46*a* of the housing 30*a*. The retaining plug member 92 holds the end portion 62*a* of the shaft 60*a* in a cylindrical recess 100 in the end wall 46*a* of the housing 30*a*.

A socket (not shown) is formed in the plug member 90*a* to enable the plug member to be rotated relative to the outer end portion 36*a* of the sector shaft 22*a*. Upon rotation of the plug member 90*a*, force is transmitted from the plug member 90*a* to an outer end portion 102 of the shaft 60*a*. This force is transmitted to the inner end portion 62*a* of the shaft 60*a* to press the inner end portion of the shaft against the end wall 46*a* of the housing 30*a*.

The force transmitted through the plug member 90 and shaft 60*a* between the outer end portion 36*a* of the sector shaft 22*a* and the end wall 46*a* of the housing 30*a* is effective to move the sector shaft 22*a* and the sector gear to which it is connected, toward the left (as viewed in FIG. 2) relative to the housing 30*a* and rack gear. This movement reduces clearance between the teeth on the rack and sector gears. Since the plug member 90 is disposed in the outer end portion 36*a* of the sector shaft 22*a*, the plug member is readily accessible when the apparatus 10 is installed in a vehicle.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels, said apparatus comprising:

a housing;

a first gear disposed in said housing and rotatable about a first axis;

a second gear disposed in meshing engagement with teeth on said first gear;

a shaft having a first end portion disposed within said housing and connected with said first gear and a second end portion disposed outside of said housing, said second end portion of said shaft being connectable with a vehicle steering linkage, said shaft having an inner side surface which defines a cylindrical passage which extends between axially opposite ends of said shaft; and an adjustment device for moving said first gear along said first axis to reduce clearance between teeth on said first and second gears, said adjustment device extending between said first and second end portions of said shaft to provide access to said adjustment device at said second end portion of said shaft, said adjustment device includes an elongated member having an end portion disposed outside of said housing and a cylindrical body which extends from said end portion of said elongated member through said passage in said shaft to an end of said cylindrical body which is disposed in engagement with said housing, said cylindrical body of said elongated member having a diameter throughout a length of said cylindrical body which is less than a diameter of said cylindrical passage to enable said end of said cylindrical body of said elongated member to be inserted into said shaft at said second end portion of said shaft which is outside of said housing and moved through said passage into engagement with said housing while said shaft is disposed in said housing.

2. An apparatus as set forth in claim 1 wherein said end portion of said elongated member which is disposed outside of said housing has an external thread convolution which is disposed in engagement with an internal thread convolution connected to said second end portion of said shaft.

* * * * *